United States Patent
Will, IV et al.

(10) Patent No.: US 12,288,031 B2
(45) Date of Patent: Apr. 29, 2025

(54) FILTERING USER INTENT ELIGIBILITY

(71) Applicant: ADP, Inc., Roseland, NJ (US)

(72) Inventors: Henry C. Will, IV, Dover, NJ (US); Stefan George Wilk, Martinsburg, WV (US)

(73) Assignee: ADP, Inc., Roseland, NJ (US)

( * ) Notice: Subject to any disclaimer, the term of this patent is extended or adjusted under 35 U.S.C. 154(b) by 234 days.

(21) Appl. No.: 17/812,338

(22) Filed: Jul. 13, 2022

(65) Prior Publication Data
US 2024/0020478 A1    Jan. 18, 2024

(51) Int. Cl.
G06F 40/289    (2020.01)
H04L 51/02    (2022.01)

(52) U.S. Cl.
CPC ............ G06F 40/289 (2020.01); H04L 51/02 (2013.01)

(58) Field of Classification Search
CPC ............................... G06F 40/289; H04L 51/02
USPC .............................................................. 704/9
See application file for complete search history.

(56) References Cited

U.S. PATENT DOCUMENTS

| | | | |
|---|---|---|---|
| 11,086,858 B1* | 8/2021 | Koukoumidis | G06F 3/013 |
| 11,914,962 B2* | 2/2024 | Johnson | G06F 40/30 |
| 12,020,259 B2* | 6/2024 | Thakkar | G06Q 30/012 |
| 2019/0103095 A1* | 4/2019 | Singaraju | G06F 16/35 |
| 2021/0082400 A1* | 3/2021 | Vishnoi | G06F 40/30 |
| 2021/0082410 A1* | 3/2021 | Teserra | G10L 15/05 |
| 2023/0063713 A1* | 3/2023 | Lukyanenko | H04L 51/046 |
| 2023/0138741 A1* | 5/2023 | Patel | G10L 15/22 704/235 |
| 2024/0143945 A1* | 5/2024 | Mehrotra | G06F 40/51 |

OTHER PUBLICATIONS

User Intent Prediction in Information-seeking Conversations Chen Qu University of Massachusetts Amherst chenqu@cs.umass.ed (Year: 2019).*
Intent Features for Rich Natural Language Understanding Brian Lester♣* and Sagnik Ray Choudhury♦† and Rashmi Prasad♣ and Srinivas Bangalore♣ (Year: 2021).*
User Intent Prediction in Information-seeking Conversations Chen Qu University of Massachusetts Amherst chenqu@cs.umass.ed (Year: 2019) (Year: 2019).*

(Continued)

*Primary Examiner* — Bharatkumar S Shah
(74) *Attorney, Agent, or Firm* — Foley & Lardner LLP (57) ABSTRACT

Filtering user intents corresponding to user utterances is provided. A list of allowed user intents is generated, using a natural language understanding model of a chatbot, based on identifying one or more of a set of user intents corresponding to a user utterance within a filtered user intent mapping table. It is determined whether a user intent having a highest confidence score in the set of user intents corresponding to the user utterance is contained in the list of allowed user intents. In response to determining that the user intent having the highest confidence score in the set of user intents corresponding to the user utterance is contained in the list of allowed user intents, content corresponding to the user intent having the highest confidence score is sent, using the chatbot, to a client device of a user who submitted the user utterance as a response to the user utterance.

26 Claims, 5 Drawing Sheets

(56) References Cited

OTHER PUBLICATIONS

Intent Features for Rich Natural Language Understanding Brian Lester@* and Sagnik Ray Choudhury@ f and Rashmi Prasad# and Srinivas Bangalore® (Year: 2021) (Year: 2021).*
Brown, "Choosing Between Multiple Intents With Watson Assistant," Medium, Nov. 1, 2018, accessed Jun. 30, 2022, 10 pages. https://medium.com/@jasonbrown_23038/choosing-between-multiple-intents-with-watson-assistant-7cd28e1ee69c.
"Expression language methods," IBM Cloud Docs, updated Jun. 2, 2022, accessed Jun. 30, 2022, 49 pages. https://cloud.ibm.com/docs/assistant?topic=assistant-dialog-methods#dialog-methods-arrays-get.
"Spring Expression Language (SpEL)," Part III. Core Technologies, accessed Jun. 30, 2022, 26 pages. https://docs.spring.io/spring-framework/docs/3.2.x/spring-framework-reference/html/expressions.html.
Sodoherty, "Compound Questions," Talk to Me Blog, Feb. 6, 2017, accessed Jun. 30, 2022, 6 pages. https://sodoherty.ai/2017/02/06/compound-questions/.
Brink, "Handling Multi-Intent Questions in Watson Assistant," Medium, Sep. 4, 2019, accessed Jun. 30, 2022, 11 pages. https://medium.com/@ryanbrink1/handling-multi-intent-questions-in-watson-assistant-ccd0c6ea21e1.
Sodoherty, "Simple Intent Tricks," Talk to Me Blog, Mar. 29, 2019, accessed Jun. 30, 2022, 7 pages. https://sodoherty.ai/2019/03/29/simple-intent-tricks/.
"How to detect more than one intent with IBM Watson Assistant?" Stack Overflow, accessed Jun. 30, 2022, 3 pages. https://stackoverflow.com/questions/51657570/how-to-detect-more-than-one-intent-with-ibm-watson-assistant.
"Controlling the conversational flow," IBM Cloud Docs, Aug. 8, 2021, accessed Jun. 9, 2022, 24 pages. https://cloud.ibm.com/docs/assistant?topic=assistant-dialog-runtime#/dialog-runtime-disambiguation.
Greyling, "Dealing With Compound User Intents In IBM Watson Assistant," Medium, May 12, 2020, accessed Jul. 13, 2022, 15 pages. https://cobusgreyling.medium.com/dealing-with-compound-user-intents-in-ibm-watson-assistant-4d27f201bc51.
Will et al., "Chatbot Disambiguation," U.S. Appl. No. 17/812,330, filed Jul. 13, 2022, 50 pages.

* cited by examiner

FILTERING USER INTENT ELIGIBILITY

BACKGROUND

1. Field

The disclosure relates generally to chatbots and more specifically to a natural language understanding model of a chatbot filtering user intents corresponding to user utterances using a set of user intent eligibility filters.

2. Description of the Related Art

A chatbot is a computer program designed to simulate conversation with human users, especially via the Internet. Typically, a conversation with a chatbot is a back-and-forth dialog, such as a user makes an initial request, the chatbot replies, the user then responds to the chatbot reply, and so on. Based on what the user inputs, the chatbot typically knows how to respond to the user. Thus, the chatbot is designed to simulate the way a human would behave as a conversational partner.

Chatbots are used in dialog systems for various purposes, such as, for example, customer support, request routing, information gathering, and the like. Generally, chatbots utilize natural language understanding to analyze what the user is requesting and respond with coded responses or conversations.

SUMMARY

According to one illustrative embodiment, a computer-implemented method for filtering user intents corresponding to user utterances is provided. A computer, using a natural language understanding model of a chatbot, generates a list of allowed user intents based on identifying one or more of a set of user intents corresponding to a user utterance within a filtered user intent mapping table. The filtered user intent mapping table contains allowed user intents. The computer determines whether a user intent having a highest confidence score in the set of user intents corresponding to the user utterance is contained in the list of allowed user intents. In response to the computer determining that the user intent having the highest confidence score in the set of user intents corresponding to the user utterance is contained in the list of allowed user intents, the computer, using the chatbot, sends content corresponding to the user intent having the highest confidence score to a client device of a user who submitted the user utterance to the chatbot as a response to the user utterance.

According to another illustrative embodiment, a computer system for filtering user intents corresponding to user utterances is provided. The computer system comprises a bus system, a storage device storing program instructions connected to the bus system, and a processor executing the program instructions connected to the bus system. The computer system, using a natural language understanding model of a chatbot, generates a list of allowed user intents based on identifying one or more of a set of user intents corresponding to a user utterance within a filtered user intent mapping table. The filtered user intent mapping table contains allowed user intents. The computer system determines whether a user intent having a highest confidence score in the set of user intents corresponding to the user utterance is contained in the list of allowed user intents. In response to the computer system determining that the user intent having the highest confidence score in the set of user intents corresponding to the user utterance is contained in the list of allowed user intents, the computer system, using the chatbot, sends content corresponding to the user intent having the highest confidence score to a client device of a user who submitted the user utterance to the chatbot as a response to the user utterance.

According to another illustrative embodiment, a computer program product for filtering user intents corresponding to user utterances is provided. The computer program product comprises a computer readable storage medium having program instructions embodied therewith, the program instructions executable by a computer to cause the computer to perform a method. The computer, using a natural language understanding model of a chatbot, generates a list of allowed user intents based on identifying one or more of a set of user intents corresponding to a user utterance within a filtered user intent mapping table. The filtered user intent mapping table contains allowed user intents. The computer determines whether a user intent having a highest confidence score in the set of user intents corresponding to the user utterance is contained in the list of allowed user intents. In response to the computer determining that the user intent having the highest confidence score in the set of user intents corresponding to the user utterance is contained in the list of allowed user intents, the computer, using the chatbot, sends content corresponding to the user intent having the highest confidence score to a client device of a user who submitted the user utterance to the chatbot as a response to the user utterance.

According to another illustrative embodiment, a method for filtering user intents corresponding to user utterances is provided. A list of allowed user intents is generated based on identifying one or more of a set of user intents corresponding to a user utterance within a filtered user intent mapping table. The filtered user intent mapping table containing allowed user intents. It is determined whether a user intent having a highest confidence score in the set of user intents corresponding to the user utterance is contained in the list of allowed user intents. In response to determining that the user intent having the highest confidence score in the set of user intents corresponding to the user utterance is contained in the list of allowed user intents, content corresponding to the user intent having the highest confidence score is sent to a client device of a user who submitted the user utterance as a response to the user utterance.

DETAILED DESCRIPTION

Figure 1:
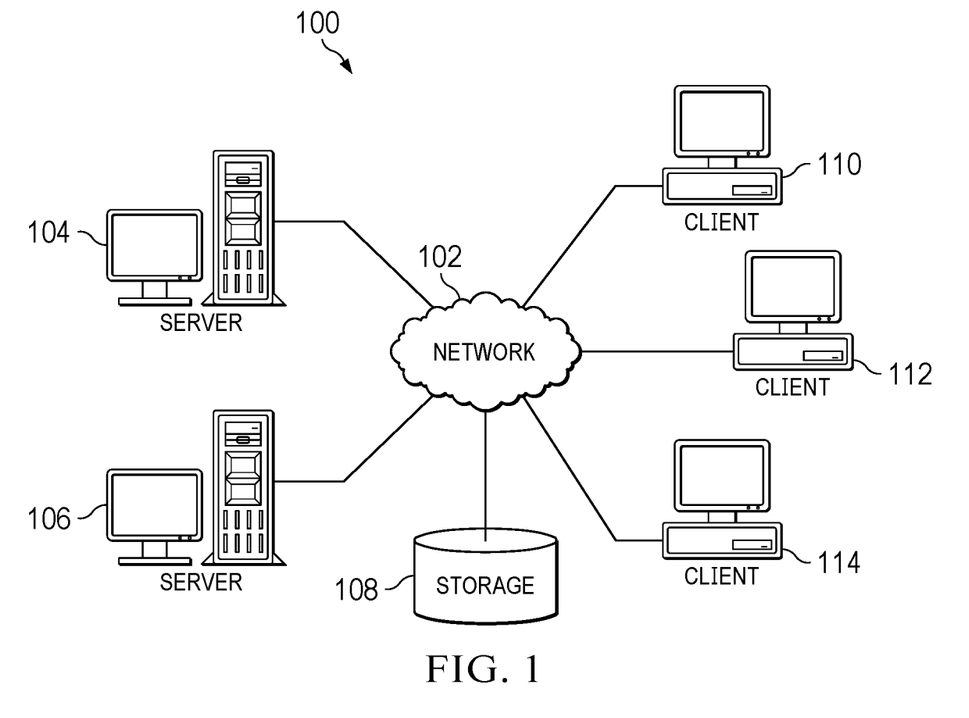
FIG. 1 is a pictorial representation of a network of data processing systems in which illustrative embodiments may be implemented.
Figure 2:
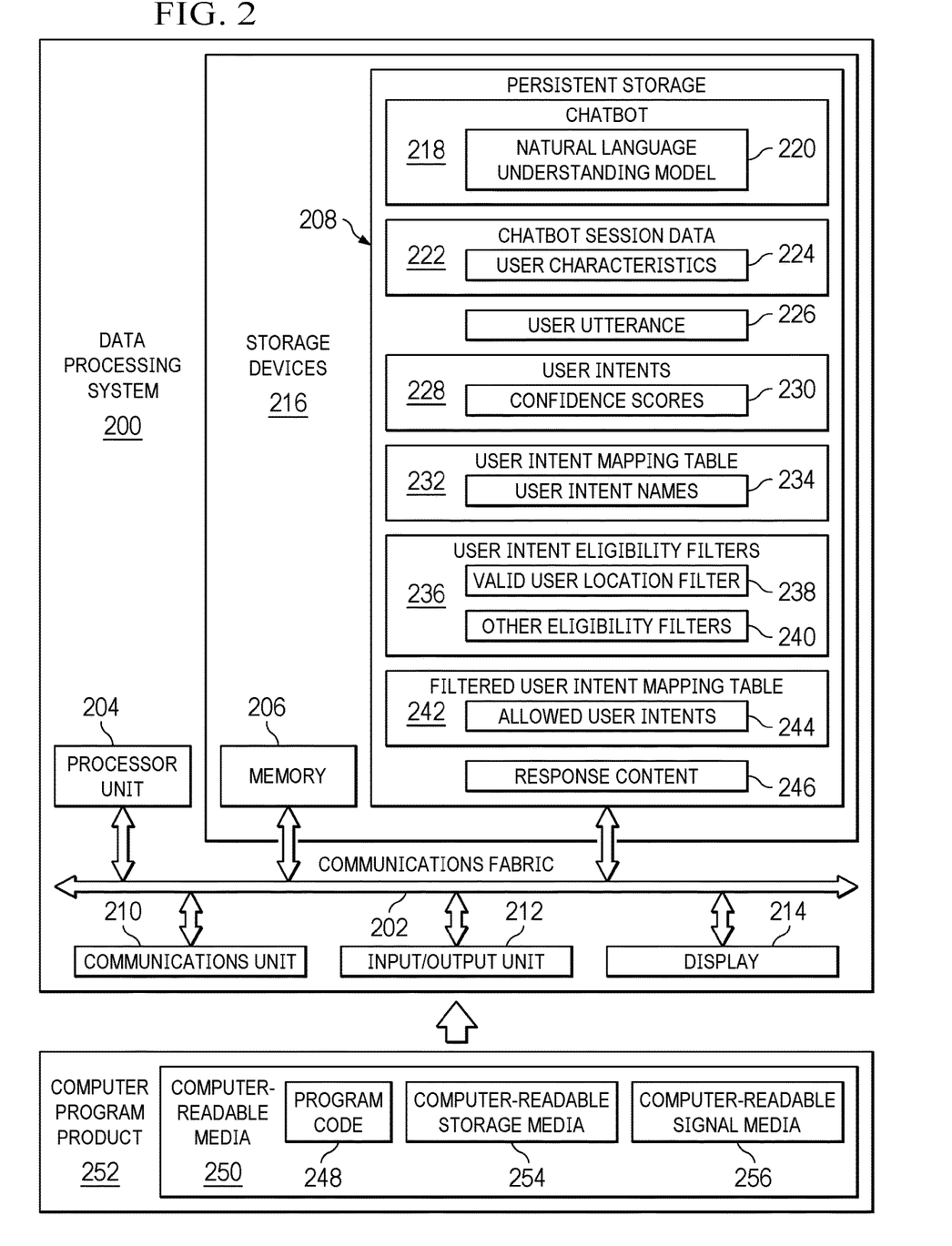
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide services, such as, for example, financial services, banking services, governmental services, educational services, healthcare services, reservation services, retail services, data services, and the like, to client device users. Further, server 104 and server 106 utilize a chatbot to provide assistance to the client device users regarding services provided by server 104 and server 106. For example, the chatbot can provide answers to initial questions, provide informational content corresponding to the services hosted by server 104 and server 106, provide routing guidance, and the like, to requests submitted by the client device users.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld or tablet computers, smart phones, smart watches, smart glasses, smart televisions, smart vehicles, smart appliances, virtual reality devices, gaming devices, kiosks, and the like, with wire or wireless communication links to network 102. Users of clients 110, 112, and 114 may utilize clients 110, 112, and 114 to access and utilize the chatbot services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of client device users, user intent mapping tables, and the like. Furthermore, storage 108 may store other types of data, such as authentication or credential data that may include usernames, passwords, and the like associated with, for example, client device users and system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network, a metropolitan area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the user intent eligibility filtering processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or computer readable storage medium is any piece of hardware that is capable of storing information, such as, for example, without limitation, data, computer readable program instructions in functional form, and/or other suitable information either on a transient basis or a persistent basis. Further, a computer readable storage device or computer readable storage medium excludes a propagation medium, such as a transitory signal. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores chatbot 218. However, it should be noted that even though chatbot 218 is illustrated as residing in persistent storage 208, in an alternative illustrative embodiment chatbot 218 may be a separate component of data processing system 200. For example, chatbot 218 may be a hardware component coupled to communication fabric 202 or a combination of hardware and software components.

Chatbot 218 controls the process of filtering user intents corresponding to user utterances using natural language understanding model 220. In this example, chatbot 218 includes natural language understanding model 220. However, it should be noted that even though natural language understanding model 220 is shown as being included in chatbot 218, natural language understanding model 220 may be a separate or stand-alone component. Chatbot 218 utilizes natural language understanding model 220 to read and understand incoming user utterances to determine the intent of the users regarding their utterances (e.g., requests, questions, for the like).

Natural language understanding model 220 utilizes deep learning to extract meaning from unstructured user utterances. Natural language understanding model 220 utilizes analytics to extract, for example, context, classifications, categories, keywords, sentiment, relations, syntax, and the like from these unstructured user utterances. Natural language understanding model 220 also provides intent recognition to identify a user's objective regarding a particular utterance by establishing the meaning of the utterance. Thus, natural language understanding model 220 enables interaction between users and chatbot 218.

Chatbot session data 222 represents information corresponding to a session established between chatbot 218 and a particular client device user via a network, such as, for example, network 102 in FIG. 1. Chatbot session data 222 includes user characteristics 224. User characteristics 224 represent information, attributes, features, or traits associated with that particular client device user. For example, user characteristics 224 may include an identifier of the user (e.g., name), identifier of the client device utilized by the user to establish the session with chatbot 218, geographic location of the client device when establishing the session with chatbot 218, role of the user (e.g., staff, manager, supervisor, team lead, or the like), security level of the user, and the like. Chatbot 218 may utilize natural language understanding model 220 to extract user characteristics 224 from at least one of chatbot session data 222 or a stored user profile corresponding to the user.

User utterance 226 represents a current textual message input by the user via a chatbot dialog user interface to chatbot 218. User utterance 226 may be, for example, a question submitted by the client device user regarding a service provided by data processing system 200, a request for information, or the like. In response to receiving user utterance 226, chatbot 218 utilizes natural language understanding model 220 to generate user intents 228 and confidence scores 230. User intents 228 represent a set of possible user intents corresponding to the context of user utterance 226. Confidence scores 230 represent scores relative to the level of confidence that natural language understanding model 220 has in predicting each respective user intent of user intents 228 corresponding to the context of user utterance 226.

User intent mapping table 232 may be, for example, a JavaScript Object Notation (JSON) array, lookup table, or the like. Natural language understanding model 220 utilizes user intent mapping table 232 to map user intents 228 to a label, text, or content corresponding to user utterance 226. User intent mapping table 232 includes user intent names 234. User intent names 234 represent a plurality of names or identifiers for defined user intents.

Below is an example of an entry in user intent mapping table 232:

```
[{
    "intent": "UC_HR_Business_Partner",
    "label": "HR Business Partner Contact Info",
    "validUserLocationFilter": ["United States"],
    "otherEligibilityFilters": ["People Managers Only"], ...
}].
```

User intent eligibility filters 236 represent a set of filters for determining whether the user is eligible or qualified to receive content corresponding to user intents 228. In this example, user intent eligibility filters 236 include valid user location filter 238 and other eligibility filters 240. Valid user location filter 238 identifies one or more geographic locations, such as, for example, one or more cities, states, countries, or the like, where the user may receive content corresponding to user intents 228. In other words, if the user is not in a geographic location that matches valid user location filter 238 (e.g., the United States), then chatbot 218 does not provide the user with the content corresponding to user intents 228. Conversely, if the user is located within a geographic area that matches valid user location filter 238, then chatbot 218 provides the user with the content corresponding to user intents 228.

Other eligibility filters 240 can include any type of filter containing any condition that chatbot 218 can compare against user characteristics 224, which natural language understanding model 220 identified in chatbot session data 222 corresponding to the user's session with chatbot 218. For example, chatbot 218 can utilize a "people managers only" filter included in other eligibility filters 240 to remove a set of specified user intents from user intent mapping table 232 when the user does not have a people manager characteristic identified in chatbot session data 222 so that the user cannot receive content corresponding to one or more of user intents 228, increasing data security.

In other words, chatbot 218 utilizes user intent eligibility filters 236 to modify user intent mapping table 232 by removing user intents not eligible for the user, thus forming filtered user intent mapping table 242. As a result, filtered user intent mapping table 242 only includes allowed user intents 244. Allowed user intents 244, which correspond to user utterance 226, identify the content that the user is eligible or qualified to receive from chatbot 218.

Chatbot 218 sends response content 246 to the client device user via the chatbot dialog user interface. Response content 246 may be, for example, a message by chatbot 218 requesting clarification from the client device user, an answer to a question submitted by the client device user, information requested by the client device user regarding a particular service, a message by chatbot 218 indicating that a particular user intent is not allowed by the client device user, or the like. For example, chatbot 218 may, for example, apologize for not being able to understand what the user is requesting, and ask the user to please rephrase the previous user utterance.

As a result, data processing system 200 operates as a special purpose computer system in which chatbot 218 in data processing system 200 enables filtering of user intents using a set of user intent eligibility filters. In particular, chatbot 218 transforms data processing system 200 into a special purpose computer system as compared to currently available general computer systems that do not have chatbot 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation long term evolution, long term evolution advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256.

In these illustrative examples, computer readable storage media 254 is a physical or tangible storage device used to store program code 248 rather than a medium that propagates or transmits program code 248. In other words, computer readable storage media 254 exclude a propagation medium, such as transitory signals. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 250" can be singular or plural. For example, program code 248 can be located in computer readable media 250 in the form of a single storage device or system. In another example, program code 248 can be located in computer readable media 250 that is distributed in multiple data processing systems. In other words, some instructions in program code 248 can be located in one data processing system while other instructions in program code 248 can be located in one or more other data processing systems. For example, a portion of program code 248 can be located in computer readable media 250 in a server computer while another portion of program code 248 can be located in computer readable media 250 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 248.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Currently, a chatbot compares an inputted user utterance to a predefined list of user intents, without an ability to "turn off" or restrict specific user intents for a particular user during the chatbot session. As a result, if user intent filtering is needed, then chatbot dialog code must be generated to manage each user intent individually. In other words, the chat bot could have different replies based on user data, but each change and all the different scenarios would have to be handled one by one on each dialog path.

However, illustrative embodiments provide a centralized function that allows rules to be created and applied generally, which greatly reduces complexity. Illustrative embodiments are capable of restricting user intent corresponding to a user utterance made by a specific user during a session with a chatbot or voicebot based on identified session data associated with the user. It should be noted that as used herein, a chatbot can include a voicebot or voice assistant. In other words, a user can input a verbal message, the chatbot can then transcribe the user's verbal message to text, analyze the text to determine a response, convert the response to a computer-generated voice response, and output the computer-generated voice response to the user.

Illustrative embodiments allow user intents recognized by a natural language understanding model of the chatbot to be processed or blocked based on identified characteristics of the user, such as, for example, user location, user job role, user employment status, and the like. Thus, illustrative embodiments enable the chatbot to recognize when a particular user should not have access to content corresponding to a given user intent. In other words, illustrative embodiments enable customized user intent filtering based on analyzing session data (e.g., user characteristics) to prevent certain users from accessing certain content (e.g., secure information, inappropriate information, or the like), which correspond to certain user intents. Illustrative embodiments utilize filtering functionality for a user's geographic location (e.g., country) and support other custom user intent filtering functionality based on other specified parameters.

For example, illustrative embodiments can block or allow dialog paths in the chatbot depending on which country a user is located in while establishing a session with the chatbot, the user's work status (e.g., manager of people, employment dates, and security level), or the like. For example, illustrative embodiments, utilizing a valid user location eligibility filter, allows the chatbot to only retrieve content corresponding to those user intents that match or apply to a particular country or set of countries. Illustrative embodiments also enable removal of ineligible user intents, as well as user intent eligibility filters, before the chatbot sends content to the user, preventing the user from seeing the criteria used by illustrative embodiments for filtering user intents.

Thus, illustrative embodiments provide one or more technical solutions that overcome a technical problem with an inability of current chatbots to autonomously filter user intents corresponding to user utterances. As a result, these one or more technical solutions provide a technical effect and practical application in the field of chatbots.

Figure 3A:
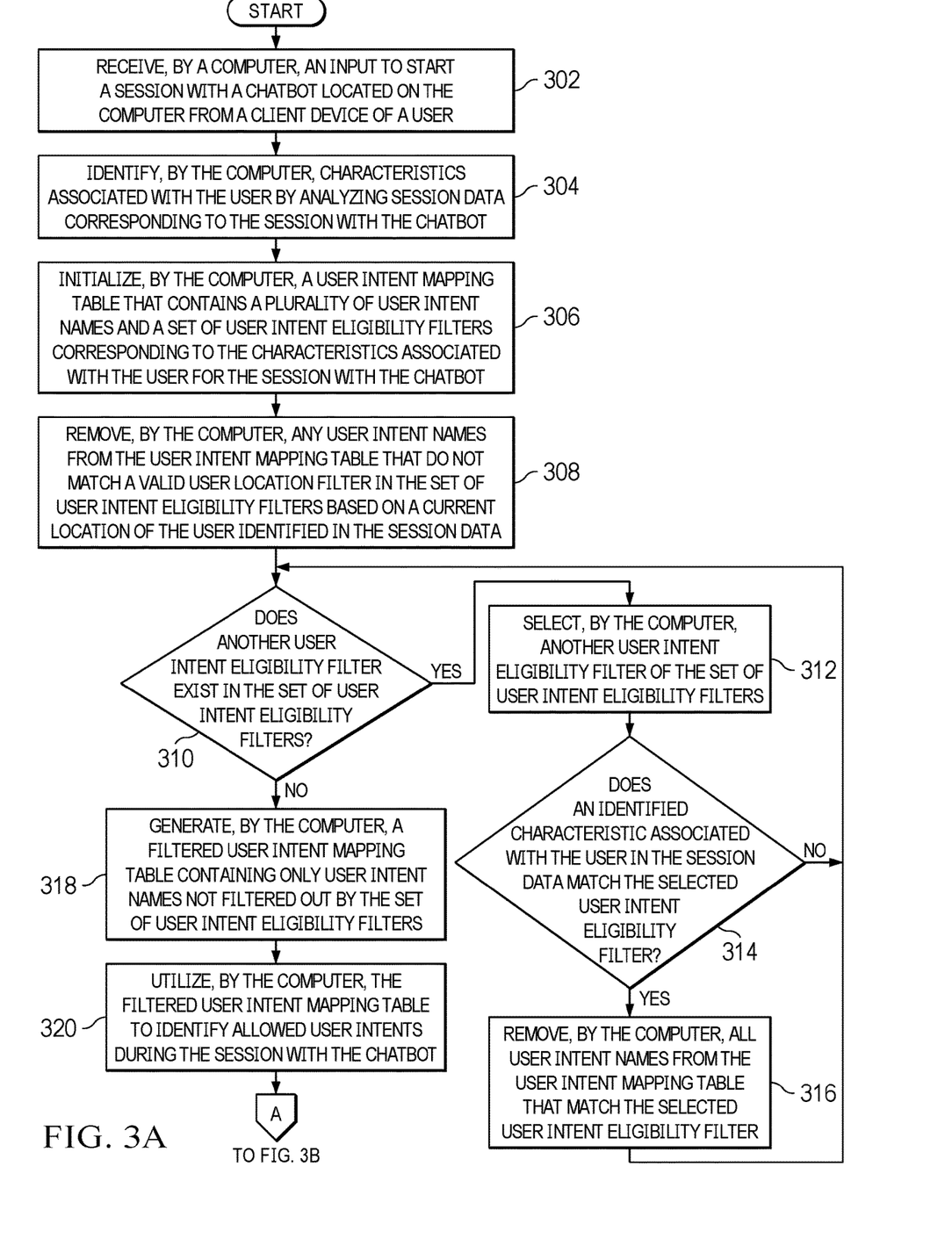
FIGS. 3A-3C are a flowchart illustrating a process for filtering user intents corresponding to user utterances in accordance with an illustrative embodiment.
Figure 3B:
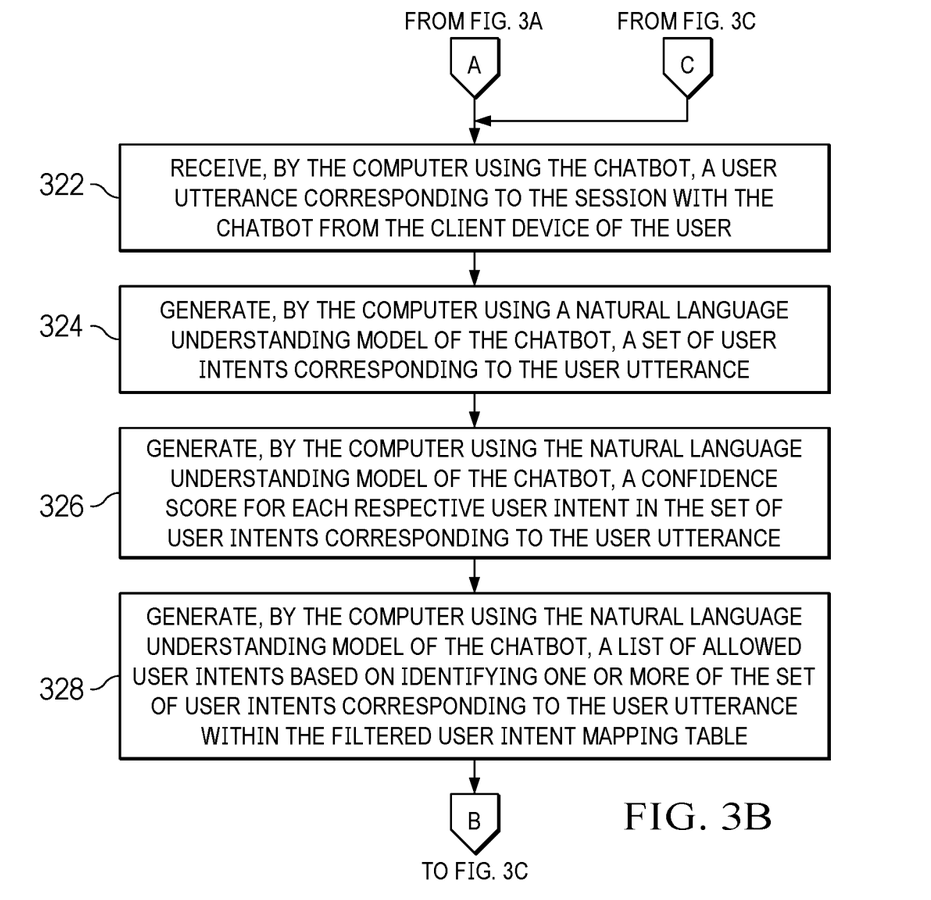
Figure 3C:
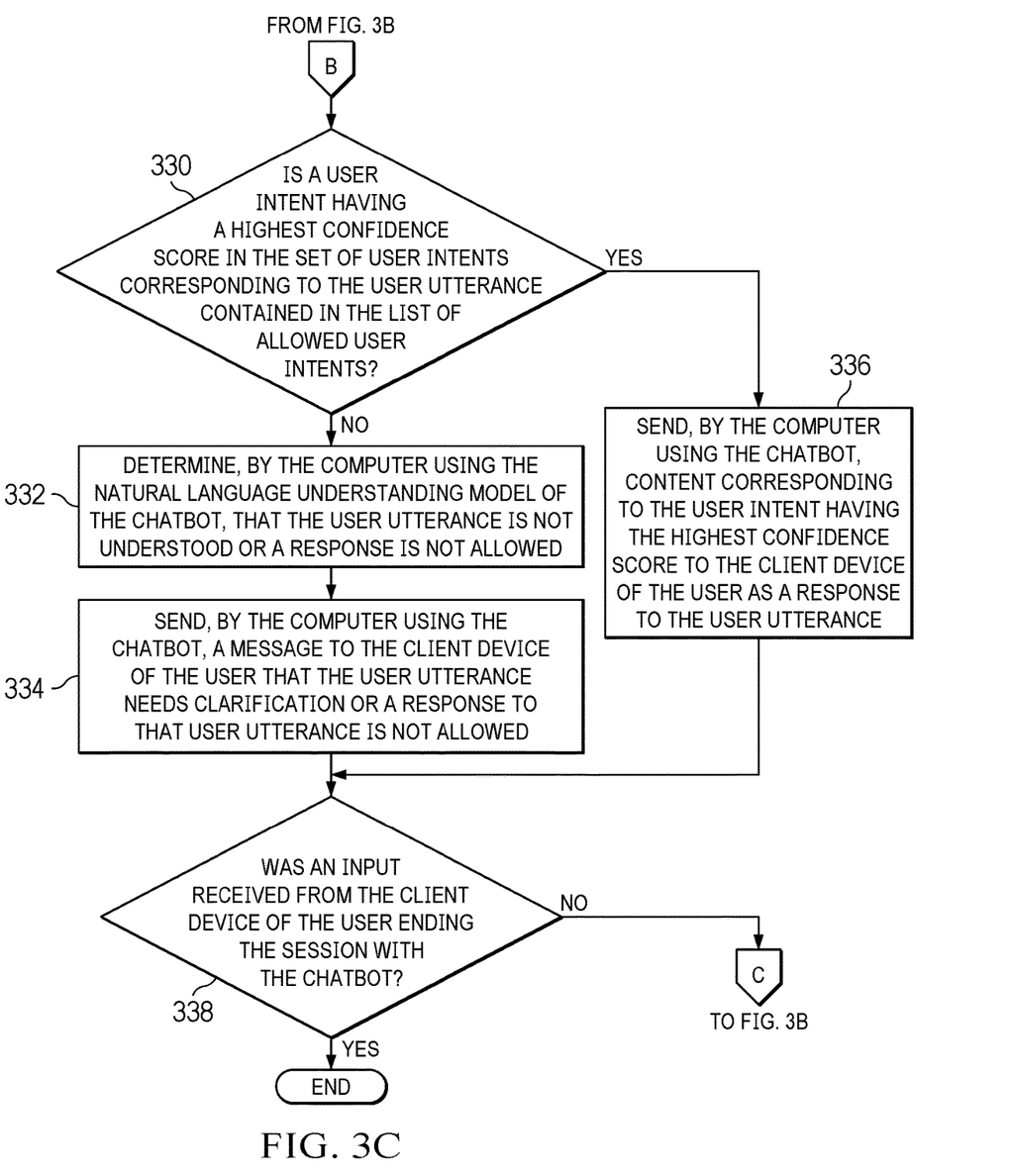

With reference now to FIGS. 3A-3C, a flowchart illustrating a process for filtering user intents corresponding to user utterances is shown in accordance with an illustrative embodiment. The process shown in FIGS. 3A-3C may be implemented in a computer, such as, for example, server 104 in FIG. 1 or data processing system 200 in FIG. 2. For example, the process can be implemented in chatbot 218 in FIG. 2.

The process begins when the computer receives an input to start a session with a chatbot located on the computer from a client device of a user (step 302). In response to receiving the input to start the session with the chatbot, the computer identifies characteristics associated with the user by analyzing session data corresponding to the session with the chatbot (step 304). The characteristics associated with the user that are identified in the session data may include, for example, an identifier corresponding to the user (e.g., user full name, user number, or the like), geographic location of the user when initiating the chatbot session, identifier of a client device utilized by the user to conduct the chatbot session, user title (e.g., manager, executive, administrator, government official, or the like), user status (e.g., fulltime employee, part-time employee, gig employee, contract worker, citizen, customer, or the like), user security credentials, and the like.

In addition, the computer initializes a user intent mapping table that contains a plurality of user intent names and also initializes a set of user intent eligibility filters corresponding to the characteristics associated with the user for the session with the chatbot (step 306). Further, the computer removes any user intent names from the user intent mapping table that do not match a valid user location filter in the set of user intent eligibility filters based on a current geographic location of the user identified in the session data (step 308). Furthermore, the computer makes a determination as to whether another user intent eligibility filter exists in the set of user intent eligibility filters (step 310). It should be noted that the computer will not select a user intent eligibility filter that has already been applied to the current session.

If the computer determines that another user intent eligibility filter does exist in the set of user intent eligibility filters, yes output of step 310, then the computer selects another user intent eligibility filter in the set of user intent eligibility filters (step 312). Afterward, the computer makes a determination as to whether an identified characteristic associated with the user in the session data matches the selected user intent eligibility filter (step 314). If the computer determines that no identified characteristic associated with the user in the session data matches the selected user intent eligibility filter, no output of step 314, then the process returns to step 310 where the computer determines whether another user intent eligibility filter exists in the set of user intent eligibility filters. If the computer determines that an identified characteristic associated with the user in the session data does match the selected user intent eligibility filter, yes output of step 314, then the computer removes all user intent names from the user intent mapping table that match the selected user intent eligibility filter (step 316). Thereafter, the process returns to step 310 where the computer determines whether another user intent eligibility filter exists in the set of user intent eligibility filters.

Returning again the step 310, if the computer determines that no other user intent eligibility filter exists in the set of user intent eligibility filters, no output of step 310, then the computer generates a filtered user intent mapping table containing only user intent names not filtered out by the set of user intent eligibility filters (step 318). The computer utilizes the filtered user intent mapping table to identify allowed user intents during the session with the chatbot (step 320).

Subsequently, the computer, using the chatbot, receives a user utterance corresponding to the session with the chatbot from the client device of the user (step 322). The user utterance may be, for example, a request for an answer to a particular question, a request for specified information, or the like. In response to receiving the user utterance, the computer, using a natural language understanding model of the chatbot, generates a set of user intents corresponding to the user utterance (step 324). Further, the computer, using the natural language understanding model of the chatbot, generates a confidence score for each respective user intent in the set of user intents corresponding to the user utterance (step 326).

Furthermore, the computer, using the natural language understanding model of the chatbot, generates a list of allowed user intents based on identifying one or more of the set of user intents corresponding to the user utterance within the filtered user intent mapping table (step 328). Afterward, the computer makes a determination as to whether a user intent having a highest confidence score in the set of user intents corresponding to the user utterance is contained in the list of allowed user intents (step 330).

If the computer determines that the user intent having the highest confidence score in the set of user intents corresponding to the user utterance is not contained in the list of allowed user intents, no output of step 330, then the computer, using the natural language understanding model of the chatbot, determines that the user utterance is not understood or a response is not allowed (step 332). In addition, the computer, using the chatbot, sends a message to the client device of the user that the user utterance needs clarification or a response to that user utterance is not allowed (step 334). Thereafter, the process proceeds to step 338. However, it should be understood that in alternative illustrative embodiments, if the computer determines that the user intent having the highest confidence score in the set of user intents corresponding to the user utterance is not contained in the list of allowed user intents, then the computer, using the chatbot, can select the top user intent in the list of allowed user intents and return content corresponding to the top user intent to the client device of the user as a response to the user utterance.

Returning again to step 330, if the computer determines that the user intent having the highest confidence score in the set of user intents corresponding to the user utterance is contained in the list of allowed user intents, yes output of step 330, then the computer, using the chatbot, sends content corresponding to the user intent having the highest confidence score to the client device of the user as a response to the user utterance (step 336). Afterward, the computer makes a determination as to whether an input was received from the client device of the user ending the session with the chatbot (step 338). If the computer determines that no input was received from the client device of the user ending the session with the chatbot, no output of step 338, then the process returns to step 322 where the computer, using the chatbot, waits to receive another user utterance. If the computer determines that an input was received from the client device of the user ending the session with the chatbot, yes output of step 338, then the process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments of the present invention provide a computer-implemented method, computer system, and computer program product for filtering user intents corresponding to user utterances by a natural language understanding model of a chatbot using user intent eligibility filters. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for filtering user intents corresponding to user utterances, the computer-implemented method comprising:
   generating, by a computer using a natural language understanding model of a chatbot, a list of allowed user intents based on identifying one or more of a set of user intents corresponding to a user utterance within a filtered user intent mapping table, the filtered user intent mapping table containing allowed user intents corresponding to a user that submitted the user utterance to the chatbot;
   determining, by the computer, whether a user intent having a highest confidence score in the set of user intents corresponding to the user utterance is contained in the list of allowed user intents; and
   responsive to the computer determining that the user intent having the highest confidence score in the set of user intents corresponding to the user utterance is contained in the list of allowed user intents, sending, by the computer using the chatbot, content corresponding to the user intent having the highest confidence score to a client device of the user as a response to the user utterance.

2. The computer-implemented method of claim 1 further comprising:
responsive to the computer determining that the user intent having the highest confidence score in the set of user intents corresponding to the user utterance is not contained in the list of allowed user intents, determining, by the computer using the natural language understanding model of the chatbot, that the user utterance is not understood or the response to the user utterance is not allowed; and
sending, by the computer using the chatbot, a message to the client device of the user that the user utterance needs clarification or the response to the user utterance is not allowed.

3. The computer-implemented method of claim 1 further comprising:
receiving, by the computer using the chatbot, the user utterance corresponding to a session with the chatbot from the client device of the user; and
generating, by the computer using the natural language understanding model of the chatbot, the set of user intents corresponding to the user utterance.

4. The computer-implemented method of claim 1 further comprising:
generating, by the computer using the natural language understanding model of the chatbot, a confidence score for each respective user intent in the set of user intents corresponding to the user utterance.

5. The computer-implemented method of claim 1 further comprising:
receiving, by the computer, an input to start a session with the chatbot located on the computer from the client device of the user;
identifying, by the computer, characteristics associated with the user by analyzing session data corresponding to the session with the chatbot in response to receiving the input to start the session with the chatbot; and
initializing, by the computer, a user intent mapping table that contains a plurality of user intent names and a set of user intent eligibility filters corresponding to the characteristics associated with the user for the session with the chatbot.

6. The computer-implemented method of claim 5 further comprising:
removing, by the computer, any user intent names from the user intent mapping table that do not match a valid user location filter in the set of user intent eligibility filters based on a current location of the user identified in the session data.

7. The computer-implemented method of claim 6 further comprising:
determining, by the computer, whether another user intent eligibility filter exists in the set of user intent eligibility filters;
responsive to the computer determining that no other user intent eligibility filter exists in the set of user intent eligibility filters, generating, by the computer, the filtered user intent mapping table containing only user intent names not filtered out by the set of user intent eligibility filters; and
utilizing, by the computer, the filtered user intent mapping table to identify allowed user intents during the session with the chatbot.

8. The computer-implemented method of claim 7 further comprising:
responsive to the computer determining that another user intent eligibility filter does exist in the set of user intent eligibility filters, selecting, by the computer, another user intent eligibility filter in the set of user intent eligibility filters;
determining, by the computer, whether an identified characteristic associated with the user in the session data matches the selected additional user intent eligibility filter; and
responsive to the computer determining that the identified characteristic associated with the user in the session data does match the selected additional user intent eligibility filter, removing, by the computer, all user intent names from the user intent mapping table that match the selected additional user intent eligibility filter.

9. A computer system for filtering user intents corresponding to user utterances, the computer system comprising:
a bus system;
a storage device connected to the bus system, wherein the storage device stores program instructions; and
a processor connected to the bus system, wherein the processor executes the program instructions to:
generate, using a natural language understanding model of a chatbot, a list of allowed user intents based on identifying one or more of a set of user intents corresponding to a user utterance within a filtered user intent mapping table, the filtered user intent mapping table containing allowed user intents corresponding to a user that submitted the user utterance to the chatbot;
determine whether a user intent having a highest confidence score in the set of user intents corresponding to the user utterance is contained in the list of allowed user intents; and
in response to determining that the user intent having the highest confidence score in the set of user intents corresponding to the user utterance is contained in the list of allowed user intents, send, using the chatbot, content corresponding to the user intent having the highest confidence score to a client device of the user as a response to the user utterance.

10. The computer system of claim 9, wherein the processor further executes the program instructions to:
in response to determining that the user intent having the highest confidence score in the set of user intents corresponding to the user utterance is not contained in the list of allowed user intents, determine, using the natural language understanding model of the chatbot, that the user utterance is not understood or the response to the user utterance is not allowed; and
send, using the chatbot, a message to the client device of the user that the user utterance needs clarification or the response to the user utterance is not allowed.

11. The computer system of claim 9, wherein the processor further executes the program instructions to:
receive, using the chatbot, the user utterance corresponding to a session with the chatbot from the client device of the user; and
generate, using the natural language understanding model of the chatbot, the set of user intents corresponding to the user utterance.

12. The computer system of claim 9, wherein the processor further executes the program instructions to:

generate, using the natural language understanding model of the chatbot, a confidence score for each respective user intent in the set of user intents corresponding to the user utterance.

13. The computer system of claim 9, wherein the processor further executes the program instructions to:
receive an input to start a session with the chatbot located on the computer system from the client device of the user;
identify characteristics associated with the user by analyzing session data corresponding to the session with the chatbot in response to receiving the input to start the session with the chatbot; and
initialize a user intent mapping table that contains a plurality of user intent names and a set of user intent eligibility filters corresponding to the characteristics associated with the user for the session with the chatbot.

14. The computer system of claim 13, wherein the processor further executes the program instructions to:
remove any user intent names from the user intent mapping table that do not match a valid user location filter in the set of user intent eligibility filters based on a current location of the user identified in the session data.

15. The computer system of claim 14, wherein the processor further executes the program instructions to:
determine whether another user intent eligibility filter exists in the set of user intent eligibility filters;
in response to determining that no other user intent eligibility filter exists in the set of user intent eligibility filters, generate the filtered user intent mapping table containing only user intent names not filtered out by the set of user intent eligibility filters; and
utilize the filtered user intent mapping table to identify the allowed user intents during the session with the chatbot.

16. The computer system of claim 15, wherein the processor further executes the program instructions to:
in response to determining that another user intent eligibility filter does exist in the set of user intent eligibility filters, select another user intent eligibility filter in the set of user intent eligibility filters;
determine whether an identified characteristic associated with the user in the session data matches the selected additional user intent eligibility filter; and
in response to determining that the identified characteristic associated with the user in the session data does match the selected additional user intent eligibility filter, remove all user intent names from the user intent mapping table that match the selected additional user intent eligibility filter.

17. A computer program product for filtering user intents corresponding to user utterances, the computer program product comprising a non-transitory computer readable storage medium having program instructions embodied therewith, the program instructions executable by a computer to cause the computer to perform a method of:
generating, by the computer using a natural language understanding model of a chatbot, a list of allowed user intents based on identifying one or more of a set of user intents corresponding to a user utterance within a filtered user intent mapping table, the filtered user intent mapping table containing allowed user intents corresponding to a user that submitted the user utterance to the chatbot;
determining, by the computer, whether a user intent having a highest confidence score in the set of user intents corresponding to the user utterance is contained in the list of allowed user intents; and
responsive to the computer determining that the user intent having the highest confidence score in the set of user intents corresponding to the user utterance is contained in the list of allowed user intents, sending, by the computer using the chatbot, content corresponding to the user intent having the highest confidence score to a client device of the user as a response to the user utterance.

18. The computer program product of claim 17 further comprising:
responsive to the computer determining that the user intent having the highest confidence score in the set of user intents corresponding to the user utterance is not contained in the list of allowed user intents, determining, by the computer using the natural language understanding model of the chatbot, that the user utterance is not understood or the response to the user utterance is not allowed; and
sending, by the computer using the chatbot, a message to the client device of the user that the user utterance needs clarification or the response to the user utterance is not allowed.

19. The computer program product of claim 17 further comprising:
receiving, by the computer using the chatbot, the user utterance corresponding to a session with the chatbot from the client device of the user; and
generating, by the computer using the natural language understanding model of the chatbot, the set of user intents corresponding to the user utterance.

20. The computer program product of claim 17 further comprising:
generating, by the computer using the natural language understanding model of the chatbot, a confidence score for each respective user intent in the set of user intents corresponding to the user utterance.

21. The computer program product of claim 17 further comprising:
receiving, by the computer, an input to start a session with the chatbot located on the computer from the client device of the user;
identifying, by the computer, characteristics associated with the user by analyzing session data corresponding to the session with the chatbot in response to receiving the input to start the session with the chatbot; and
initializing, by the computer, a user intent mapping table that contains a plurality of user intent names and a set of user intent eligibility filters corresponding to the characteristics associated with the user for the session with the chatbot.

22. The computer program product of claim 21 further comprising:
removing, by the computer, first user intent names of the plurality of user intent names from the user intent mapping table that do not match a valid user location filter in the set of user intent eligibility filters based on a current location of the user identified in the session data.

23. The computer program product of claim 22 further comprising:
determining, by the computer, whether at least one other user intent eligibility filter exists in the set of user intent eligibility filters;

responsive to the computer determining that no other user intent eligibility filter exists in the set of user intent eligibility filters, generating, by the computer, the filtered user intent mapping table containing only second user intent names of the plurality of user intent names not filtered out by the set of user intent eligibility filters; and utilizing, by the computer, the filtered user intent mapping table to identify the allowed user intents during the session with the chatbot.

24. The computer program product of claim 23 further comprising:

responsive to the computer determining that another user intent eligibility filter does exist in the set of user intent eligibility filters, selecting, by the computer, an additional user intent eligibility filter in the set of user intent eligibility filters;

determining, by the computer, whether an identified characteristic associated with the user in the session data matches the selected additional user intent eligibility filter; and responsive to the computer determining that the identified characteristic associated with the user in the session data does match the selected additional user intent eligibility filter, removing, by the computer, the second user intent names from the user intent mapping table that match the selected additional user intent eligibility filter.

25. A method for filtering user intents corresponding to user utterances, the method comprising:

generating a list of allowed user intents based on identifying one or more of a set of user intents corresponding to a user utterance within a filtered user intent mapping table, the filtered user intent mapping table containing allowed user intents corresponding to a user that submitted the user utterance;

determining whether a user intent having a highest confidence score in the set of user intents corresponding to the user utterance is contained in the list of allowed user intents; and responsive to determining that the user intent having the highest confidence score in the set of user intents corresponding to the user utterance is contained in the list of allowed user intents, sending content corresponding to the user intent having the highest confidence score to a client device of the user as a response to the user utterance.

26. The method of claim 25 further comprising:

responsive to determining that the user intent having the highest confidence score in the set of user intents corresponding to the user utterance is not contained in the list of allowed user intents, determining that the user utterance is not understood or the response to the user utterance is not allowed; and sending a message to the client device of the user that the user utterance needs clarification or the response to the user utterance is not allowed.

* * * * *